United States Patent
Ponnuswamy et al.

(10) Patent No.: US 11,341,230 B1
(45) Date of Patent: May 24, 2022

(54) MAINTAINING DUAL-PARTY AUTHENTICATION REQUIREMENTS FOR DATA RETENTION COMPLIANCE

(71) Applicant: EMC IP Holding Company LLC, Hopkinton, MA (US)

(72) Inventors: Senthil Ponnuswamy, San Jose, CA (US); Marcelo Vinante, Georgetown, TX (US); Anjali Anjali, Sunnyvale, CA (US); Anurag Sharma, Cedar Park, TX (US); Rekha Sampath, Saratoga, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 235 days.

(21) Appl. No.: 16/712,684

(22) Filed: Dec. 12, 2019

(51) Int. Cl.
| | |
|---|---|
| *G06F 21/45* | (2013.01) |
| *G06F 3/06* | (2006.01) |
| *G06F 21/62* | (2013.01) |
| *H04L 29/06* | (2006.01) |

(52) U.S. Cl.
CPC ............ *G06F 21/45* (2013.01); *G06F 3/0622* (2013.01); *G06F 3/0637* (2013.01); *G06F 3/0673* (2013.01); *G06F 21/62* (2013.01); *H04L 63/083* (2013.01); *H04L 63/102* (2013.01); *G06F 2221/2113* (2013.01)

(58) Field of Classification Search
CPC ........ G06F 21/45; G06F 21/62; G06F 3/0622; G06F 3/0673; G06F 3/0637; G06F 2221/2113; H04L 63/102; H04L 63/083
See application file for complete search history.

(56) References Cited

U.S. PATENT DOCUMENTS

| | | | |
|---|---|---|---|
| 9,087,187 B1 * | 7/2015 | Doane | H04L 63/083 |
| 2007/0011446 A1 * | 1/2007 | Kato | H04L 63/102 |
| | | | 713/150 |

* cited by examiner

*Primary Examiner* — Khoi V Le
(74) *Attorney, Agent, or Firm* — Dergosits & Noah LLP; Todd A. Noah (57) ABSTRACT

Described is a system for maintaining dual-party authentication requirements for data retention compliance in systems with remote access components. When administering a data retention policy, an operating system component may require a dual-party authentication mechanism to prevent data deletion, while a different authentication mechanism may control access to the remote access controller. Access to the remote access controller by a single privileged user, however, may enable overriding or compromising the retention lock compliance implemented by the operating system. Accordingly, the system may tie the dual-party authentication requirement to the remote access controller authentication mechanism.

20 Claims, 7 Drawing Sheets

MAINTAINING DUAL-PARTY AUTHENTICATION REQUIREMENTS FOR DATA RETENTION COMPLIANCE

TECHNICAL FIELD

This disclosure relates to data storage systems, and more particularly, ensuring authentication mechanisms are maintained for securing data.

BACKGROUND

Data storage systems (or on-demand storage services) may provide various tools that are crucial for enterprise level network clients. For example, clients may rely on such systems to efficiently back up and recover data in the event of user error, data loss, system outages, hardware failure, or other catastrophic events to allow business applications to remain in service or quickly come back up to service. In addition, as part of a data storage service, providers may provide tools for retaining data according to various data retention policies and regulations. For example, storage systems may ensure immutable copies of data are retained for a predefined amount of time. To provide such capabilities, storage systems may prevent the unauthorized deletion of data. For example, storage systems may implement procedures that require authentication from multiple parties before retained data may be deleted. Such an authentication requirement may be administered by components related to a filesystem of the storage system. However, due to the large number of interconnected components that may be implemented by a storage system, there is a potential that such authentication requirements may be circumvented when managing storage hardware. Consequently, changes to storage configurations may result in the inadvertent deletion of retained data. Thus, there is a continued need to provide mechanisms to ensure that data retention policies are maintained within storage systems.

BRIEF DESCRIPTION OF THE DRAWINGS

The accompanying drawings, which are incorporated into and constitute a part of this specification, illustrate embodiments of the disclosure and together with the description, serve to explain the principles of the disclosure.

DETAILED DESCRIPTION

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure. Although these embodiments are described in sufficient detail to enable one skilled in the art to practice the disclosed embodiments, it is understood that these examples are not limiting, such that other embodiments may be used and changes may be made without departing from their spirit and scope. For example, the operations of methods shown and described herein are not necessarily performed in the order indicated and may be performed in parallel. It should also be understood that the methods may include more or fewer operations than are indicated. In some embodiments, operations described herein as separate operations may be combined. Conversely, what may be described herein as a single operation may be implemented in multiple operations.

Reference in the specification to "one embodiment" or "an embodiment" or "some embodiments," means that a particular feature, structure, or characteristic described in conjunction with the embodiment can be included in at least one embodiment of the disclosure. The appearances of the phrase "embodiment" in various places in the specification do not necessarily all refer to the same embodiment.

In some embodiments, described is a system (and method) for maintaining dual-party authentication requirements for data retention compliance. For example, as part of a data retention policy, a storage service may store data as a retention (or archival) copy of production data and ensure that such data is retained according to various standardized requirements (e.g. Securities and Exchange Commission (SEC) Rule 17a-4(f)). In addition, as part of the overall storage service, various tools to manage and monitor hardware may be available such as a remote access controller. The remote access controller may allow a system administrator to perform various operations associated with storage components and hardware. The remote access controller, however, may use a different authentication mechanism than, for example, a filesystem that invokes a dual-party authentication mechanism to modify the retained data. Accordingly, access to the remote access controller may enable overriding or compromising the retention lock compliance implemented by the filesystem. Accordingly, in some embodiments, described is a system that ties the dual-party authentication requirement of the filesystem to the remote access controller authentication mechanism.

To provide such a capability, the system may apply a retention lock to data stored by a storage system. For example, the retention lock may require a dual-party authentication to modify (e.g. delete) the data. In some embodiments, the retention lock may be administered by the operating system (e.g. filesystem) of the storage system. As described, the storage system may include a remote access controller that allows a privileged user (e.g. system administrator) to reconfigure storage components and/or storage volumes. As a result of such reconfigurations, the underlying retained data may be deleted by the single privileged user of the remote access controller. To prevent such a circumvention of a dual-party authentication requirement, the system may implement enable a retention lock compliance mode (or feature). For example, the retention lock compliance mode may reset (e.g. delete) all previous user accounts associated with the remote access controller and create new user accounts including an administrative and limited user account. In some embodiments, the limited user account may be limited to performing operations associated with restarting or powering-on the storage system using the remote access controller (e.g. in the event the operating system of the storage system crashes). The retention lock compliance mode, however, performs a specialized process (or workflow) to enforce a dual-party authentication requirement to access the remote access controller as the administrative user. As a result, a dual-party authentication requirement is preserved throughout aspects of the storage system to maintain data retention compliance.

In some embodiments, such a system may be provided within an operating environment. An example of such an operating environment is further described herein with reference to FIG. 1. However, in general, embodiments of the disclosure may include and/or be implemented in an operating environment including a cloud-based services environment that may be, or include, a data protection operating environment that includes backup and disaster recovery services. For example, at least some functionality may be provided by, or implemented in connection with, various platforms such as the Data Domain™ data protection platform provided by Dell EMC™ Corporation (Dell EMC), and associated systems, methods, and components, although use of this particular platform is provided only by way of illustration and is not required.

In some embodiments, the operating environment may take the form of a cloud-based environment. However, embodiments of the disclosure may also be implemented for an on-premises environment, and hybrid environments that include public and private elements, as well as any other type of environment. In addition, any of these cloud environments, or other operating environments, may take the form of an operating environment that is partly, or completely, virtualized. The environment may include one or more host devices that each host one or more applications used by a client of the environment. As such, a particular client may employ, or otherwise be associated with, one or more instances of each of one or more applications. In general, the applications employed by the clients are not limited to any particular functionality or type of functionality.

Any of the devices, including the clients, servers, and hosts, in the operating environment can take the form of software, physical machines, or virtual machines (VM), or any combination thereof, though no particular device implementation or configuration is required for any embodiment. Similarly, storage components such as databases, storage servers, storage volumes, storage disks, backup servers, restore servers, backup clients, and restore clients, for example, can likewise take the form of software, physical machines or virtual machines (VM), though no particular component implementation is required for any embodiment. Where VMs are employed, a hypervisor or other virtual machine monitor (VMM) can be employed to create and control the VMs.

As used herein, the term "data" is intended to be broad in scope. Accordingly, data may include data objects (or objects), data segments such as may be produced by data stream segmentation processes, data chunks, data blocks, atomic data, emails, files, contacts, directories, sub-directories, volumes, etc. In addition, the storage of data can employ any suitable storage technique, infrastructure, hardware (e.g. Solid State Drive (SSD), Hard Disk Drive (HDD)), or on virtual storage systems provided by a cloud service provider, etc.

Figure 1:
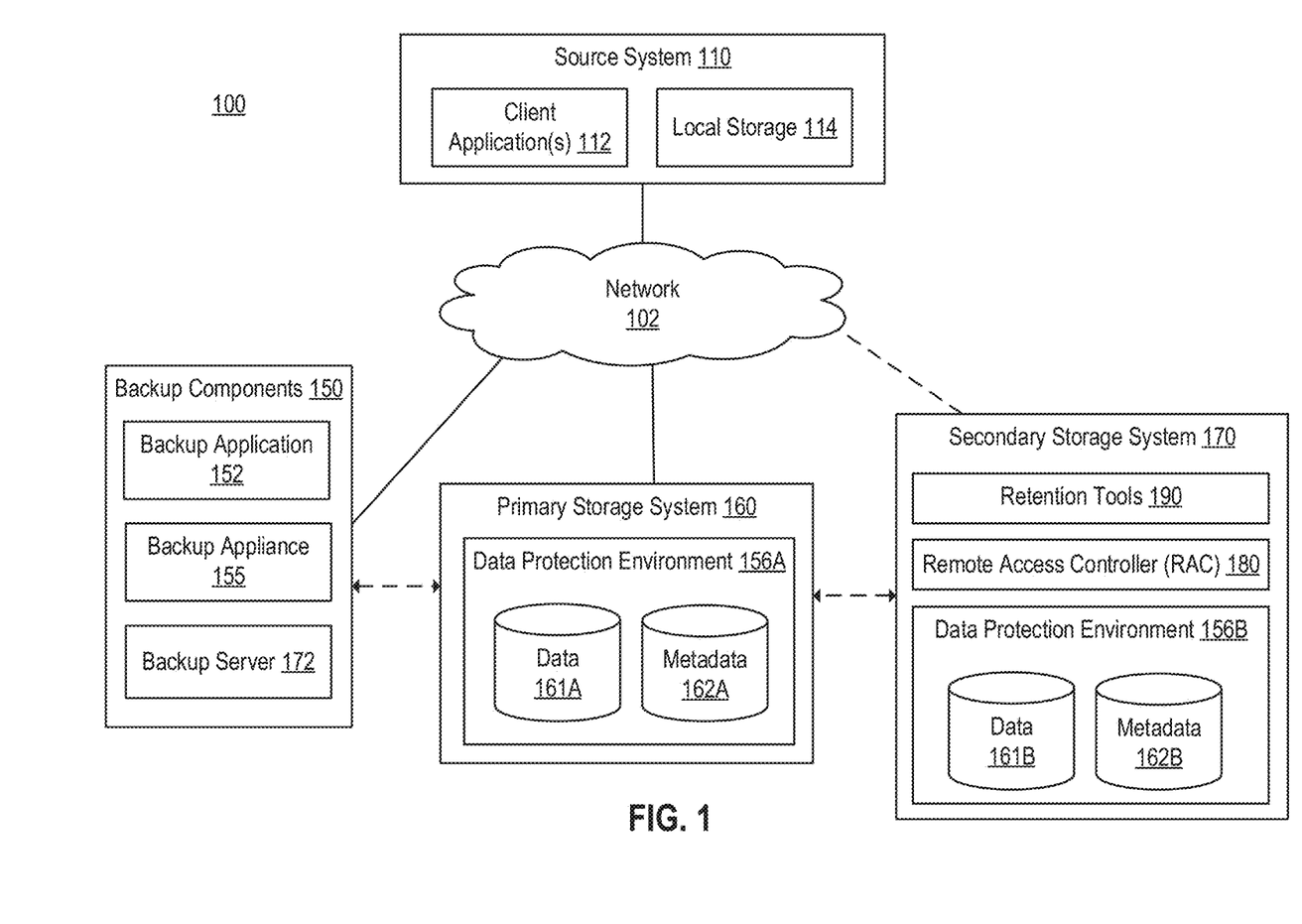
FIG. 1 is a block diagram illustrating an example operating environment for maintaining dual-party authentication policies for data retention according to one or more embodiments of the disclosure.

More specifically, and with reference to FIG. 1, shown is a block diagram illustrating an example of an operating environment 100 for maintaining dual-party authentication policies for data retention according to one or more embodiments of the disclosure.

In some embodiments, components of the operating environment 100 may provide data protection and recovery services to a client (or customer) associated with the source system 110. As further described herein, such services may include providing data retention services. For example, the secondary storage system 170 may store data 161B as a retention (or archival) copy of production data (e.g. data 161A), and ensure that data 161B is retained according to various standardized requirements (e.g. Securities and Exchange Commission (SEC) Rule 17a-4(f)).

As shown, the environment 100 may include a source system 110, backup components 150, a primary storage system 160, and a secondary storage system 170. It should be noted that the components of operating environment 100 may interact via a network 102, which may be any type of wired or wireless network including a local area network (LAN), a wide area network (WAN), or a direct communication link, or other suitable connection.

The source system (or client system) 110 may act as a client from which data to be protected originates. The source system 110 may host one or more client applications 112, and may include local storage 114, as well as an interface for communicating with other systems and devices, such as the storage systems 160/170. In general, the client applications 112 may create new and/or modified data that is desired to be protected. As such, the source system 110 is an example of a host device. The local storage 114 can be used to locally store data, which may be backed up. Accordingly, the backed-up data can be securely retained accordingly to various policies as further described herein.

The backup components 150, may include a backup application 152 that performs (or manages, coordinates, etc.) the creation and restoration of data that may be backed-up. For example, data to be backed-up from the source system 110 may be communicated from the source system 110 to the backup application 152 for initial processing, after which the processed data is uploaded from the backup application 152 for storage within a storage system 160/170 (e.g. as data 161). In some embodiments, the backup application 152 may cooperate with a backup client application of the source system 110 to back up client data to primary storage system 160. A backup application 152 may also cooperate with a backup client application to restore backup data from the storage systems 160/170 to the source system 110. In some embodiments, the backup application 152 may be a part of, or work in conjunction with, a backup appliance 155. For example, the backup (or storage) appliance 155 may include a Dell EMC CloudBoost appliance, although any suitable appliance is contemplated. In addition, the backup components 150 may include one or more of a backup server 172 that may be implemented in conjunction with a Data Domain deduplication storage server provided by Dell EMC for use with DDR storage devices. In some embodiments, the backup server 172 may be a Dell EMC Avamar server or a Dell EMC Networker server, although no particular server is required, and other backup and storage system configuration are contemplated. It should be noted that the backup components 150 (e.g. backup application 152, backup appliance 155, or backup server 172) can be implemented in various forms, such as a virtual, physical, or native public cloud appliance to fit the requirements of a particular configuration, and the backup application 152 can be used with various types of data protection environments, including public and private object storage clouds.

As part of a data protection and recovery service, storage systems 160/170 may store data in a deduplicated manner. For example, each storage system 160/170 (e.g. in conjunction with backup components 150) may represent one or more components of a Data Domain™ Restorer (DDR)-based deduplication storage system. Each storage system 160/170 may include a data protection environment 156, which stores data 161, and metadata 162 associated with the data 161.

In some embodiments, the secondary storage system 170 may be configured to provide replication (or recovery, mirroring, etc.) capabilities for primary storage system 160. For example, the primary storage system 160 may include a first data protection environment 156A that includes a first instance of data (e.g. production data, or production backup data) 161A along with associated metadata 162A, and the secondary storage system 170 may include a second data protection environment 156B that includes a second instance of data (e.g. recovery data, or recovery backup data) 162B along with associated metadata 162B. As described, in some embodiments, the secondary storage system 170 may store data 161B as a retention (or archival) copy of production data (e.g. data 161A), and ensure that data 161B is retained according to various standardized requirements, which may include enforcing certain authentication policies (e.g. dual-party requirement) for modifying the data 161B. For example, modifying data may include any operations that alter the properties (e.g. contents, dates, metadata, filename, etc.) that may affect the integrity of the data. For example, preventing modifications may include preventing the deletion of data or associated metadata.

In some embodiments, the operating environment 100 may include a production environment and a disaster recovery environment. For example, the primary storage system 160 may be part of a production environment (or production system), and the secondary storage system 170 may be part of a disaster recovery environment, both of which may provide data protection and recovery (or disaster recovery) services to a client (or customer). In some embodiments, the primary storage system 160 may be an on-premises system and the secondary storage system 170 may be part of a cloud-based system (or service). In some embodiments, the primary storage system 160 may also be provided as part of a cloud-based system (or service). However, in such scenarios, an entity (e.g. cloud service provider) providing the primary storage system 160 may be different than the entity (or entities) providing the secondary storage system 170.

As described, the secondary storage system 170 may ensure data 161B is secured and retained according to various policies required by a client (or customer). Accordingly, the secondary storage system 170 may include retention tools 190. The retention tools 190 may include various software components, APIs, libraries, classes, etc., to ensure that immutable copies of data 161B remain persistent for a predetermined amount of time. For example, the retention tools 190 may ensure that all the data 161B (e.g. files) that are locked for a time-based retention period cannot be deleted or overwritten under any circumstances until the retention period expires. To provide such capabilities, the tools may implement various features or policies such as requiring dual-party (or multi-party) authentication procedures for certain administrative actions. For example, a dual-party procedure may require verifying credentials of a regular administrative user plus a second authorized user (e.g. a "Security Officer") to perform certain administrative operations associated with the locked data. The dual-party authentication requirement may ensure that certain administrative actions are under the purview and control of a higher authority above and beyond an administrative user. In addition, the retention tools 190 may also implement various other policies such as disallowing operations that could compromise the state of locked data, securing the system clock from illegal updates, audit logging for any operations that are executed upon the locked data, disabling various "doors" of access that could compromise the state of the locked data or the state of the retention attributes, or other security policies. In some embodiments, the retention tools 190 may include Dell EMC Data Domain Retention Lock® (DD Retention Lock) components, although any suitable set of tools are contemplated. In some embodiments, retention tools 190 may be compatible with various industry-standards, such as NAS-based (CIFS, NFS) Write-Once-Read-Many (WORM) protocols.

In some embodiments, one or more storage systems 160/170 may also include remote access or monitoring components. For example, as shown, the secondary storage system 170 may include a remote access controller (RAC) 180 that may operate (control, access, configure, manage, etc.) hardware (or software) components of storage system 170. In some embodiments, the remote access controller 180 may include the Dell Remote Access Controller (DRAC), or functionally similar product, for providing an out-of-band management platform on certain platforms (e.g. Dell EMC PowerEdge server platform). In addition, in some embodiments, the remote access controller 180 may be provided on a separate expansion card, or integrated into the main board of a server. For example, the remote access controller 180 may also include the Integrated Dell Remote Access Controller (iDRAC). In addition, in some embodiments, the remote access controller 180 may be provided as part of a baseboard management controller (BMC). For example, the BMC may be a specialized service processor that monitors the physical state of the storage system (e.g. server, network server, or other hardware device) using sensors and communicates with a system administrator through an independent network connection.

When utilized, the remote access controller 180 may allow a system administrator (or other privileged user) to perform operations on a server that provides the data protection environment 156B. In some embodiments, the remote access controller 180 may be operable from a network-based interface (e.g. browser) to manage and monitor hardware such as storage components associated with the server. For example, the remote access controller 180 may have to ability to operate and configure functions related to power management, virtual media access, and remote console capabilities. In addition, the remote access controller 180 may provide a user with various administrative capabilities to access functionality of an operating system associated with the server hardware. In some embodiments, the remote access controller 180 may include one or more resources (e.g. physical components) that are distinct from server resources. For example, the remote access controller 180 may have its own processor, memory, network connection, and access to the system bus of the server that allows performing operations associated with the server using its own components. For example, with the remote access controller 180 enabled and using its own separate network connection, a user may log in and reboot the server even if the operating system is unavailable (e.g. has crashed).

As described, the remote access controller 180 may use a different authentication mechanism than, for example, an operating system (e.g. filesystem) that invokes a dual-party authentication mechanism to modify the retained data 161B. For example, secondary storage system 170 may include multiple authentication mechanisms for a storage server as further described with reference to FIG. 2.

Figure 2:
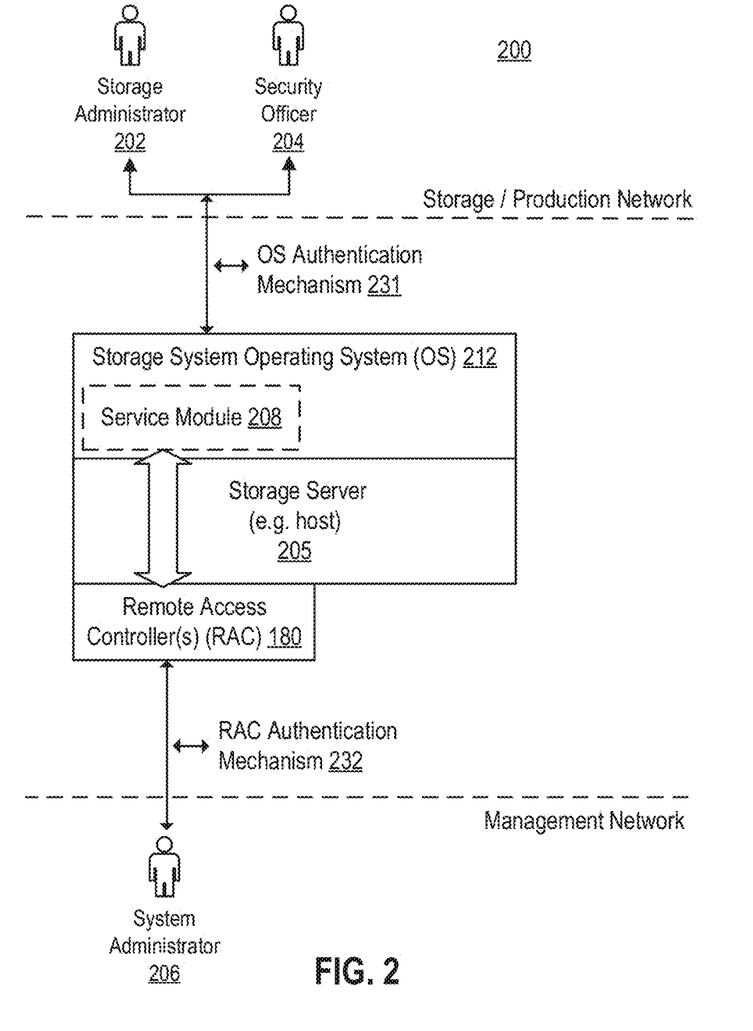
FIG. 2 is a diagram illustrating an example representation of the authentication mechanisms within a storage system according to one or more embodiments of the disclosure.

FIG. 2 is a diagram 200 illustrating an example representation of the authentication mechanisms within a storage system according to one or more embodiments of the disclosure.

As shown, a storage server 205 (or host system, device, computer, etc.) may operate in conjunction with a storage system operating system (OS) 212. For example, the storage server 205 may be part of a storage system (e.g. secondary storage system 170). In some embodiments, the storage server 205 may manage a set (or array) of storage components (or devices) that store the data to be retained (e.g. data 161B). As described, the storage server 205 may include (or work in conjunction with) the remote access controller 180. In addition, a service module 208 may work in conjunction with the remote access controller 180 to expand the remote access management to the storage system OS 212. For example, the service module (or agent, API, etc.) 208 may include a process that is part of the storage system OS 212. In some embodiments, the service module 208 may include the iDRAC Service Module (iSM), or functionally similar product.

As shown, a storage administrator 202, and a security officer 204 may access the storage server 205 from a storage/production network. For example, a storage (or database) administrator 202 may include a user responsible for managing (or configuring, operating, etc.) storage configurations and settings associated with the storage server 205. In some embodiments, the storage administrator 202 may interact with the storage server 205 via a storage administrator interface. As described, a security (or compliance) officer (or user) 204 may provide a supervisory level authentication beyond an administrative user. For example, a dual-party procedure may require verifying credentials of a regular administrative user (e.g. storage administrator 202) plus the security officer 204 to perform certain administrative operations associated with the retained (or locked) data. Accordingly, the dual-party authentication requirement may ensure that certain administrative actions are under the purview and control of a higher authority above and beyond an administrative user.

As shown, access to the storage server 205 from the storage/production network may be granted by an operating system (OS) authentication mechanism 231. The OS authentication mechanism 231 may be administered (or provided, enforced, implemented, invoked, etc.) by the storage system OS 212. In some embodiments, the filesystem of the storage system OS 212 may administer the authentication mechanism 231. In addition, in some embodiments, the security features of the OS authentication mechanism 231 may be provided by hardware (e.g. resources) of the storage server 205. For example, in some embodiments, OS authentication mechanism 231 may be executed by one or more processors (or CPUs) of the storage server 205.

Additionally, as shown, a system administrator 206 may access the storage server 205 from at least a management network. For example, a system (or network management) administrator 206 may include a user responsible for managing the server, network, or storage hardware associated with the storage server 205. The system administrator 206 may also have the authority to create user accounts (e.g. remote access controller accounts) and define privileges associated with such accounts. In some embodiments, the system administrator 206 may access the remote access controller 180 via a dedicated network connection/component. It should be noted that both a storage administrator 202 and a system administrator 206 may be considered an administrative or privileged user. In addition, such a user (or associated user account) may correspond to the same party (e.g. user or person), or a different party (e.g. user or person). However, to provide an additional layer of security, a security officer 204 may be a different party (or user or person) than the storage administrator 202 and system administrator 206.

A shown, access to the storage server 205 from the management network may be granted by a remote access controller authentication mechanism 232. As described, the remote access controller authentication mechanism 232 may be administered by components (e.g. software/hardware) that are different than the components that administer the OS authentication mechanism 231. In some embodiments, a specialized interface may be provided that allows a newly created administrative user (e.g. new system administrator 206) to access the remote access controller 180 for a limited duration once a retention lock compliance mode is activated. In some embodiments, the remote access controller 180 may execute on a separate processor (or CPU) than the processor(s) that executes the storage system OS 212 of the storage server 205. For example, the RAC authentication mechanism 232 may be administered by a baseboard management controller (BMC) that provides (or works in conjunction with) the remote access controller 180.

As described, based on the capabilities of the remote access controller 180, a privileged user (e.g. system administrator 206) may perform various operations that may affect the integrity of retained data managed by a storage server 205. For example, the privileged user may reconfigure storage components and/or storage volumes that store or reference the retained data. As a result of such reconfigurations, the underlying retained data, which may be locked (e.g. subject to a dual-party authentication policy for retention), may be deleted (e.g. maliciously or inadvertently) by the single privileged user of the remote access controller 180.

Accordingly, due to the high degree of access afforded to a single privileged user of the remote access controller 180, in some embodiments, described is a specialized configuration that ensures authentication mechanisms are preserved throughout aspects of the storage system as further described with reference to FIG. 3.

Figure 3:
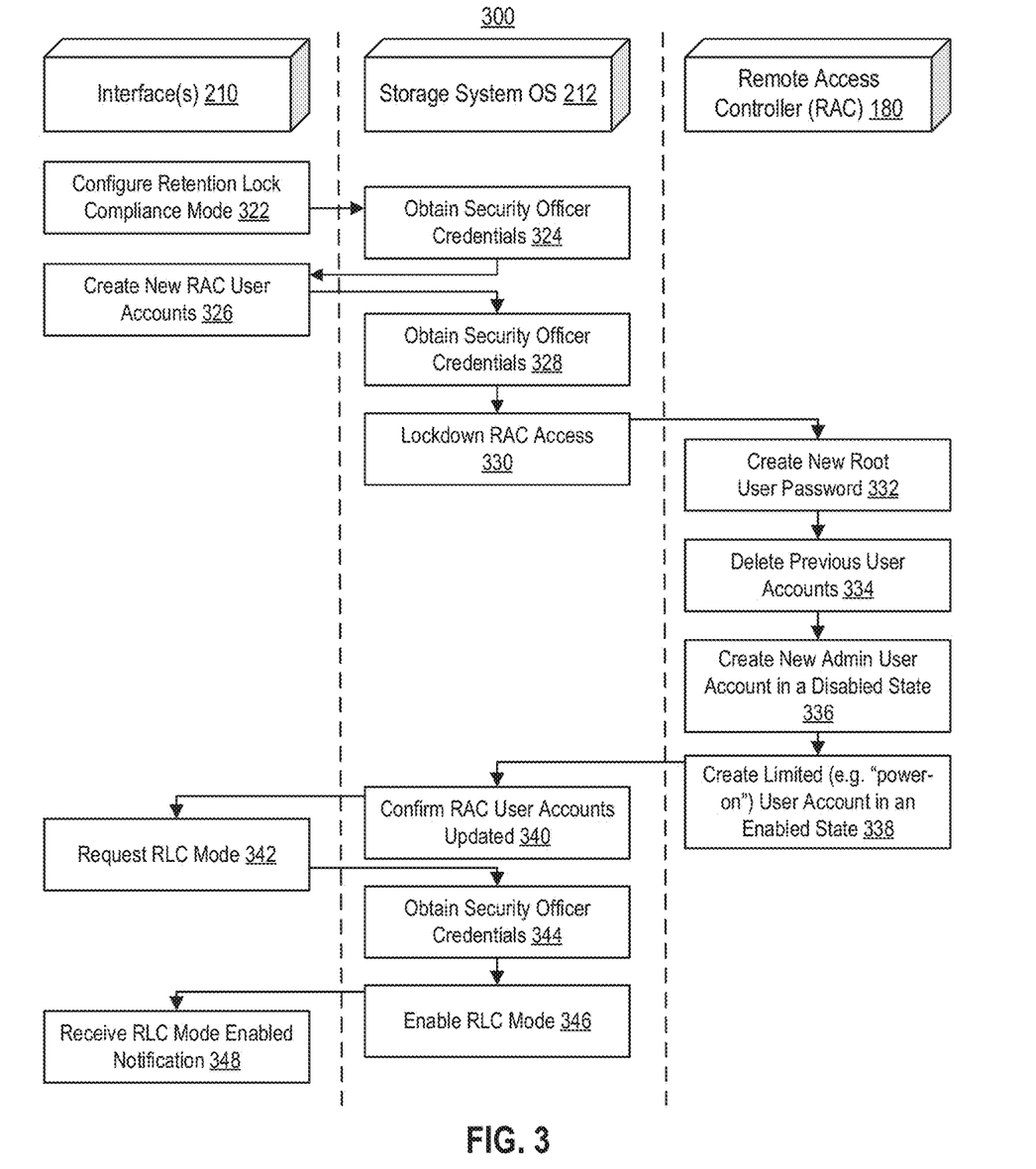
FIG. 3 is a process flow diagram illustrating an example of an interaction between components for enabling a retention lock compliance mode for a storage system according to one or more embodiments of the disclosure.

FIG. 3 is a diagram 300 illustrating an example interaction between components for enabling a retention lock compliance mode for a storage system according to one or more embodiments of the disclosure.

In some embodiments, maintaining a dual-party (or multiparty) authentication requirement for modifying retention data (or locked data) may be implemented by enabling a retention lock compliance mode (or feature). As shown, enabling a retention lock compliance mode may involve an interaction between one or more interface(s) 210, a storage system operating system (OS) 212, and a remote access controller (RAC) 180. In some embodiments, the interface 210 may include multiple interfaces. For example, the interface 210 may include a storage administrator interface that allows a storage administrator (e.g. storage administrator 202) to request activation of the retention lock compliance mode. The interface 210 may also include a specialized interface that allows a newly created administrative user (e.g. system administrator 206) to access the remote access controller 180 for a limited duration after the retention lock compliance mode is activated.

As part of the shown process flow, in 322, a retention lock compliance mode may be configured via the interface 210. For example, an administrative user (e.g. first party) such as a storage administrator, may provide the configuration information after providing the appropriate credentials to access the interface 210. For example, credentials may include a password, biometric, key, certificate, or any other form of secure information verifying the identity (or authorization) of the user. The configuration information may include various settings (or options) such as a duration for enabling an administrative user of the remote access controller, login and password information for remote access controller user accounts, and other relevant settings. In response to initiating the configuration of the retention lock compliance mode, in 324, the storage system OS 212 may obtain security officer (e.g. second party) credentials. Accordingly, the configuration may not proceed until the credentials of the security officer are verified, and thus, ensuring a dual-party authentication requirement is preserved. As described, the security officer may ensure that certain administrative actions are under the purview and control of a higher authority above and beyond the administrative user.

Once the security officer credentials are verified, in 326, the creation of new remote access controller user accounts may be initiated. In some embodiments, the new user accounts for the remote access controller may be initiated by the administrative user (e.g. storage administrator) via the interface 210. In 328, the storage system OS 212 may once again obtain security officer credentials, before initiating a lockdown to the remote access controller access by any users including previously authorized remote access controller users. In some embodiments, the storage system OS 212 may send an instruction (e.g. via a service module 208) to the remote access controller 180, which then performs such a lockdown. In some embodiments, the lockdown may include the remote access controller 180 creating a new root user password in 332. For example, creating a new root user password may function as a reset of the previous user accounts allowed to access the remote access controller 180. In some embodiments, to limit the potential exposure of the root user password, the storage system OS 212 may periodically initiate the creation of new root user passwords. For example, the new root user passwords may be periodically reset once the retention lock compliance mode is enabled (e.g. after operation 346). In addition, the root user password may only be known to the storage system OS 212, and thus, not exposed to external components. In 334, the previous user accounts for the remote access controller 180 may be deleted (or disabled), which may include deleting any previous (e.g. existing) administrative (or privileged) user accounts. In addition to deleting the existing user accounts, any active user account sessions may also be terminated (or disabled, ended, etc.) to fully disable access to the remote access controller 180.

In response to deleting the previous user accounts, in 336, a new administrative user account for the remote access controller 180 may be created. For example, the new administrative user account may be created with credential information (e.g. login/password) that may be provided as part of the configuration information provided by the administrative user via the interface 210. In some embodiments, the new administrative user account may be created in a disabled state. For example, access to the remote access controller 180 as an administrative user may require a dual-party authentication requirement as further described herein. In addition, in some embodiments, the new administrative user account may have certain restrictions (e.g. a "blacklisted" set of operations). For example, the new administrative user account may not be authorized to perform certain user management operations such as creating new user accounts, and updating or deleting existing user accounts associated with the remote access controller 180. In addition, in 338, a limited user account for the remote access controller 180 may be created. For example, the limited user account may also be created with credential information (e.g. login/password) that may be provided as part of the configuration information provided by the administrative user via the interface 210. In some embodiments, the limited user account may be created in an enabled state to perform a limited set of operations. For example, the limited user account may include a specialized user account that may perform a limited (or "whitelisted") set of operations. For example, the whitelisted set of operations may include allowing a user (e.g. "power-on" user) to rebooting (or resetting, restarting, etc.) components of the storage system (e.g. storage server) in the event the system encounters operational issues. In other words, the limited user account may restrict a user to operations associated with restarting or powering-on components of the storage system using the remote access controller 180. For example, if the server crashes or otherwise becomes offline, the limited user account may access the server, via the remote access controller 180, to initiate (or execute) operations (e.g. reboot) that allow the server to come back online or otherwise return to an operational state.

In 340, the updates to the remote access controller user accounts may be confirmed. For example, upon confirmation of the updates, the storage system OS 212 may provide an indication to the administrative user, via the interface 210, that the retention lock compliance mode has been configured. Accordingly, once the remote access user accounts have been reset, in 342, the administrative user may request that the retention lock compliance mode be enabled. In response to the request, in 344, the storage system OS 212 may obtain security officer credentials before enabling (or activating) the retention lock compliance mode in 346. By requesting the security officer credentials, the dual-party authentication requirement may be maintained. Once enabled, in 348, a notification may be received by the administrative user, via the interface 210, indicating the retention lock compliance mode has in fact been enabled.

Figure 4:
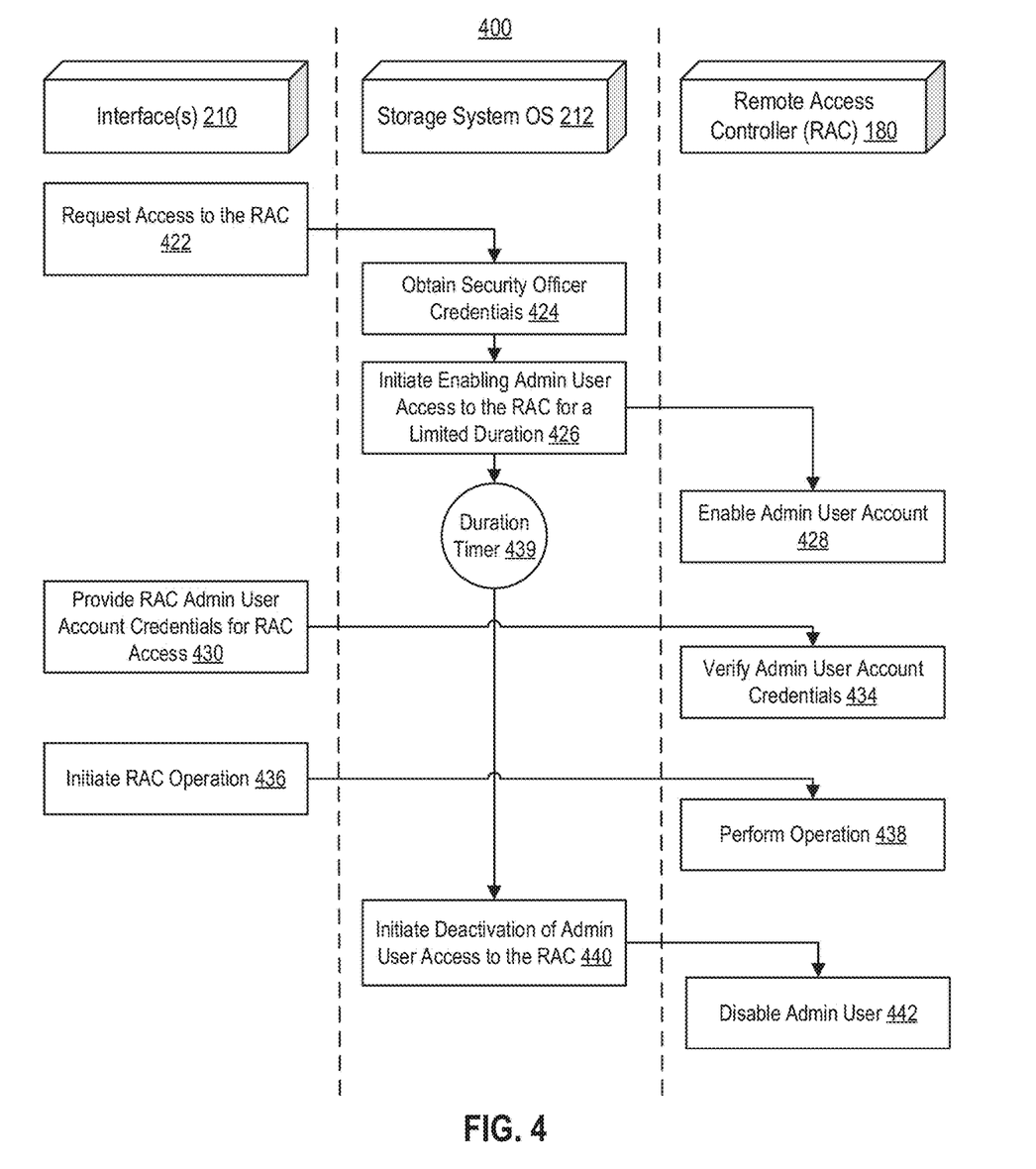
FIG. 4 is a process flow diagram illustrating an example of an interaction between components for providing access to a remote access controller when a retention lock compliance mode is enabled for a storage system according to one or more embodiments of the disclosure.

FIG. 4 is a diagram 400 illustrating an example interaction between components for providing access to a remote access controller when a retention lock compliance mode is enabled for a storage system according to one or more embodiments of the disclosure. In order to access the remote access controller 180 once the retention lock compliance mode is enabled, a dual-authentication may be required.

Accordingly, as part of the process flow shown, in 422, a request to access the remote access controller may be received. For example, an administrative user (e.g. first party) such as a storage administrator may initiate the request to access the remote access controller after providing the appropriate credentials (e.g. login information) to access the interface 210. In response to requesting access to the remote access controller, in 424, the storage system OS 212 may obtain security officer (e.g. second party) credentials. Accordingly, the request may not be granted until the credentials of the security officer are verified, and thus, ensuring a dual-party authentication requirement is preserved. Once the security officer credentials are verified, in 426, the storage system OS 212 may initiate enabling administrative user access to the remote access controller. For example, an administrative user may be enabled for a limited duration. In some embodiments, the storage system OS 212 may send an instruction (e.g. via a service module 208) to the remote access controller 180, which then enables the administrative user account in 428. Once the administrative user account is enabled, such an administrative user may attempt to access the remote access controller 180. In some embodiments, the administrative user of the remote access controller 180 may access the remote access controller 180 via the interface 210. Thus, in 430, the administrative user may provide administrative user account credentials to access the remote access controller 180 via the interface 210. Once the remote access controller 180 verifies such credentials in 434, the administrative user may initiate various remote access controller operations in 436. Such operations may also be initiated from the interface 210, and in response, the remote access controller 180 may perform such operations in 438.

As described, the administrative user account may be enabled for a limited duration, and accordingly, in 439, the storage system OS 212 may maintain a duration timer for enabling the administrative user account. Accordingly, in 440, the system may initiate deactivating the administrative user account once the limited duration is met (e.g. via service module 208). For example, if the limited duration is set for a period of 12 hours, the system may disable the administrative user account after 12 hours have elapsed. Thus, once the limited duration has elapsed, the remote access controller 180 may disable the administrative user account in 442. After disabling the administrative user account, the account may again be enabled by repeating the process described above (e.g. process of diagram 400).

Figure 5:
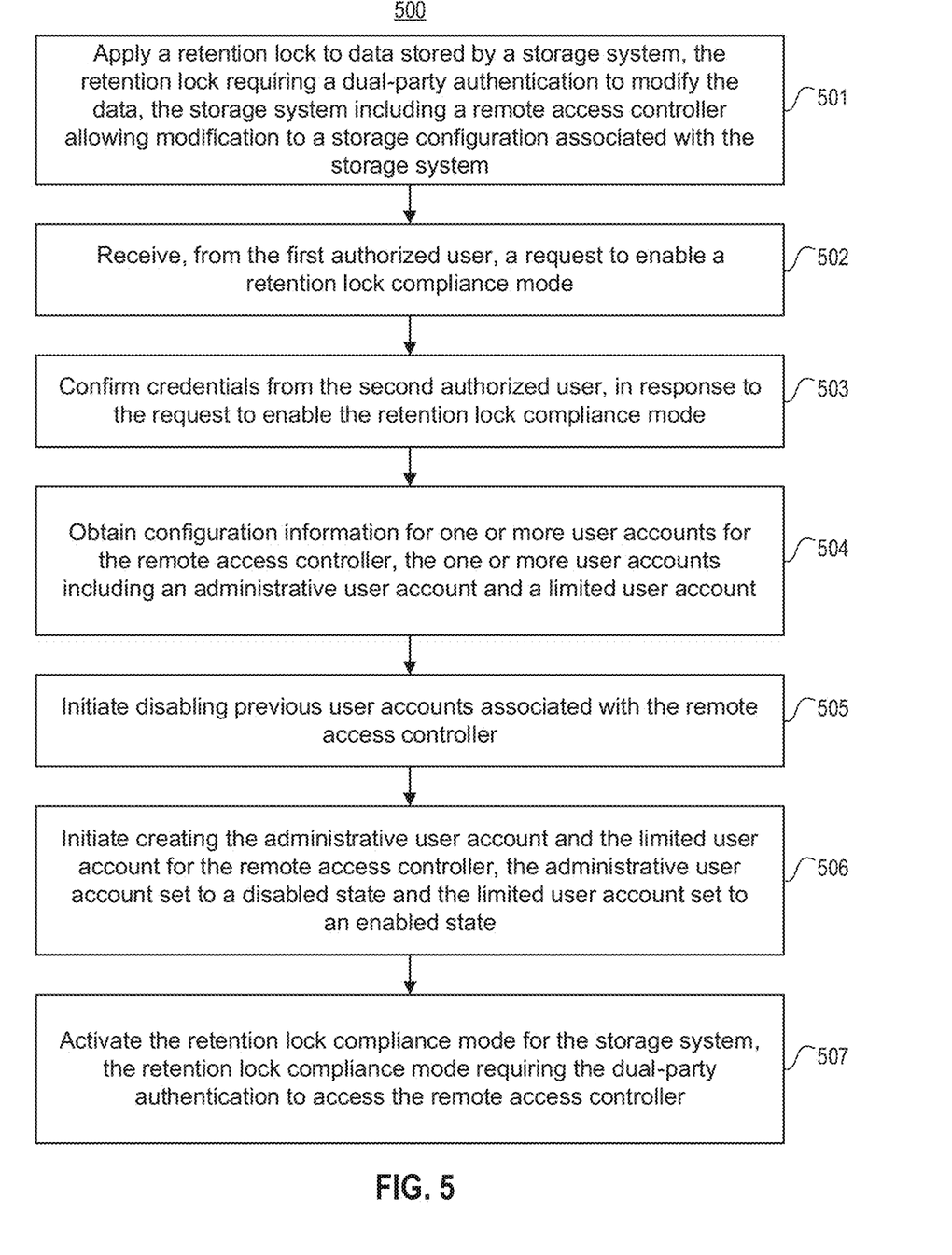
FIG. 5 is a flow diagram illustrating an example method of maintaining a dual-party authentication mechanism for accessing a remote access controller of a storage system according to one or more embodiments of the disclosure.

FIG. 5 is a flow diagram 500 illustrating an example method of maintaining a dual-party authentication mechanism for accessing a remote access controller of a storage system according to one or more embodiments of the disclosure. Process 500 may use processing logic, which may include software, hardware, or a combination thereof. For example, process 500 may be performed by a system including one or more components (e.g. secondary storage system 170, storage system OS 212, storage server 205, etc.) described in operating environment 100.

In 501, the system may apply a retention lock to data stored by a storage system (e.g. secondary storage system 170). In some embodiments, the retention lock may require a dual-party authentication (e.g. OS authentication mechanism 231) to modify the data (e.g. data 161B). For example, the dual-party authentication may require credentials from a first authorized user (e.g. storage administrator 202) and a second authorized user (e.g. security officer 204).

As described, the storage system may be a configuration that includes a remote access controller (e.g. remote access controller 180) that allows a third authorized user (e.g. previous or currently existing system administrator 206) to modify a storage configuration associated with the storage system. For example, modifying a storage configuration (or settings, options, etc.) may include reconfiguring storage components, storage volumes, directories, files, or any associated information that may affect (e.g. modify, delete, cause files to become unreferenced, etc.) the data stored by the storage system. In some embodiments, allowing the third authorized user to modify the storage configuration associated with the storage system may include allowing the third authorized user to perform operations (e.g. via the remote access controller) that cause data stored by the storage system to be deleted, or otherwise unreadable (or inaccessible). In addition, in some embodiments, the storage system may include a server (e.g. storage server 205) managing a set of storage components that store the data, and the remote access controller may include physical components associated with the server. For example, the remote access controller may execute on a separate processor than the processor executing an operating system of the storage system.

In some embodiments, the dual-party authentication mechanism for the retention lock may be administered by an operating system of the storage system (e.g. storage system OS 212). For example, a filesystem of the storage system (or server) may administer the dual-party authentication mechanism. In some embodiments, an authentication mechanism (RAC authentication mechanism 232) for the remote access controller may be administered by components of the remote access controller independent of the filesystem or OS. For example, in some embodiments, the remote access controller may execute on a separate processor (or CPU) than the processor(s) executing the operating system (e.g. storage system OS 212) of the storage system. In some embodiments, the authentication mechanism of the remote access controller may be administered (or provided, managed, etc.) by a baseboard management controller (BMC) associated with (or providing) the remoted access controller. Accordingly, the remote access controller may be part of a BMC of a server within the storage system.

In 502, the system may receive, from the first authorized user, a request to enable a retention lock compliance mode. In some embodiments, the request may be provided via an interface (e.g. interface 210).

In 503, the system may confirm credentials from the second authorized user (e.g. security officer 204), in response to the request to enable the retention lock compliance mode. As described, credentials may include a password, biometric, key, certificate, or any other form of secure information verifying the identity (or authorization) of the user. In some embodiments, the second authorized user may be different than the first and third authorized user. For example, the first authorized user may be a storage administrator, and the third authorized user may be a system administrator, which may be the same person as the storage administrator. However, the second authorized user may be a security officer to provide a degree of oversight or supervisory authority, and therefore, would be a different user (or person) than the first and third user.

In 504, the system may obtain configuration information for one or more new user accounts associated with the remote access controller. In some embodiments, the one or more user accounts may include an administrative user account and a limited user account. For example, the limited user account may restrict a user to operations associated with restarting or powering-on the storage system using the remote access controller.

In 505, the system may initiate disabling previous user accounts associated with the remote access controller. For example, the previous user accounts may include an account associated with the third authorized user. The system may also terminate any active user account sessions (or logins) associated with the remote access controller. In some embodiments, disabling the previous user accounts may also include resetting a root password for the remote access controller, and deleting the previous user accounts associated with the remote access controller. In addition, in some embodiments, the root user password may be reset periodically once the retention lock compliance mode is activated (or enabled).

In 506, the system may initiate creating the administrative user account and the limited user account for the remote access controller. In some embodiments, the administrative user account may be set to a disabled state, and the limited user account may be set to an enabled state. For example, if an OS of the storage system crashes, the limited user account may initiate a rebooting of the storage system without requiring a dual-authentication because the limited user does not have access to operations that directly comprise the integrity of the retained data.

In 507, the system may activate the retention lock compliance mode for the storage system. As described, in some embodiments, the retention lock compliance mode requires the dual-party authentication to access the remote access controller as an administrative user.

Figure 6:
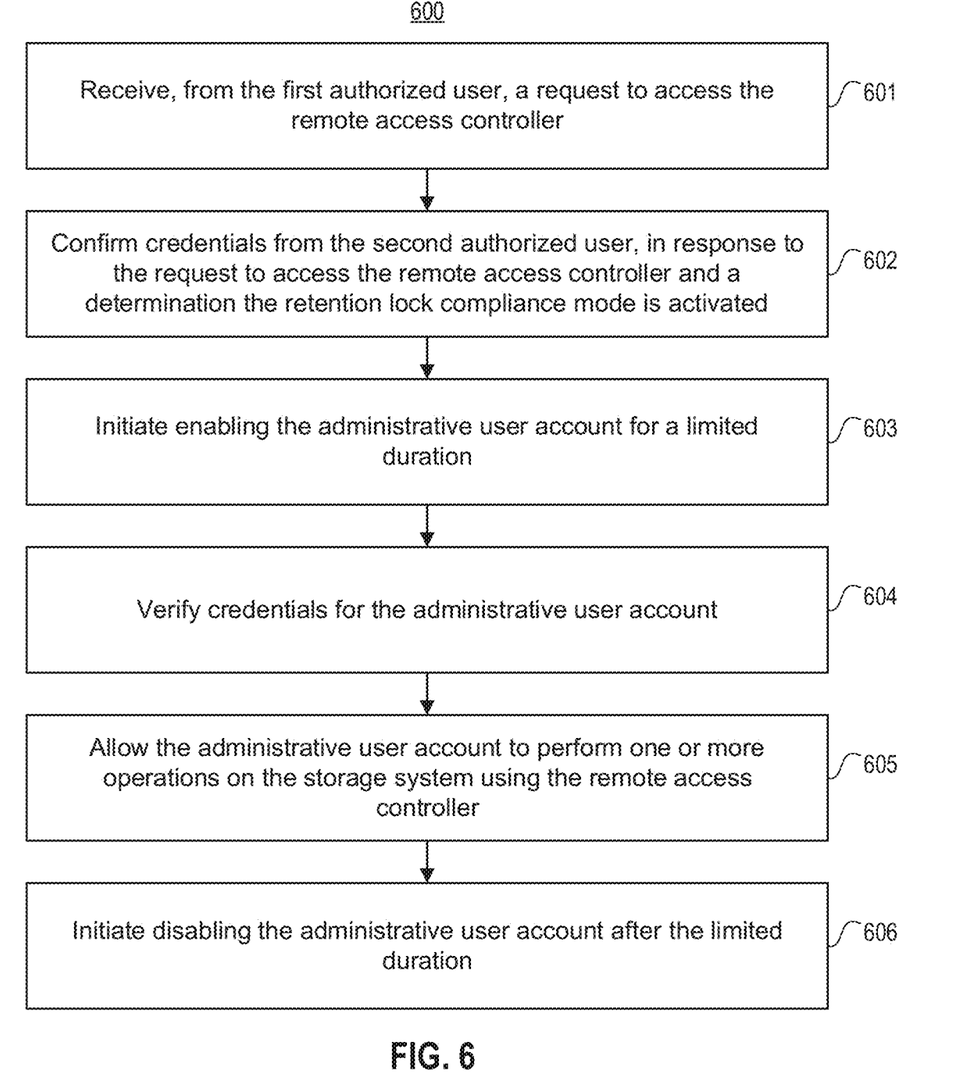
FIG. 6 is a flow diagram illustrating an example method of enabling an administrative user account associated with a remote access controller by providing a dual-party authentication according to one or more embodiments of the disclosure.

FIG. 6 is a flow diagram 600 illustrating an example method of enabling an administrative user account associated with a remote access controller by providing a dual-party authentication according to one or more embodiments of the disclosure. Process 600 may use processing logic, which may include software, hardware, or a combination thereof. For example, process 600 may be performed by a system including one or more components (e.g. secondary storage system 170, storage system OS 212, storage server 205, etc.) described in operating environment 100.

In 601, the system may receive, from the first authorized user (e.g. storage administrator 202), a request to access the remote access controller. In some embodiments, the request may be provided via an interface (e.g. interface 210).

In 602, the system may confirm credentials from the second authorized user (e.g. security officer 204), in response to the request to access the remote access controller and a determination the retention lock compliance mode is activated (or enabled). For example, dual-party authentication may be preserved when the system determines the retention lock compliance mode is activated.

In 603, the system may initiate enabling the administrative user account for a limited duration. For example, the system may send an instruction via a service module (e.g. service module 208) to the remote access controller to enable the administrative user account.

In 604, the system may verify credentials for the administrative user account. For example, the credentials may have been specified during the creation of the new user accounts for the remote access controller.

In 605, the system may allow the administrative user account to perform one or more operations on the storage system using the remote access controller. For example, the administrative user account may be authorized to perform an expanded set of operations that may be performed by the remote access controller because the dual-party authentication requirement has been maintained. For example, the administrative user account may be authorized to perform remote access controller operations related to managing server hardware such as operations required to service or replace disk drives, motherboards, and additional components such as field/customer replaceable units (FRU/CRU). However, to further secure the system, the administrative user account may be limited with respect to certain operations. For example, the administrative user account may not be authorized to perform certain user management operations such as creating new user accounts, and updating or deleting existing user accounts associated with the remote access controller.

In 606, the system may initiate disabling the administrative user account after the limited duration. For example, if the limited duration is set for a period of 12 hours, the system may disable the administrative user account after 12 hours have elapsed (or expired).

Accordingly, in some embodiments, the methods ensure a dual-party authentication requirement is preserved throughout aspects of the storage system to maintain data retention compliance.

Figure 7:
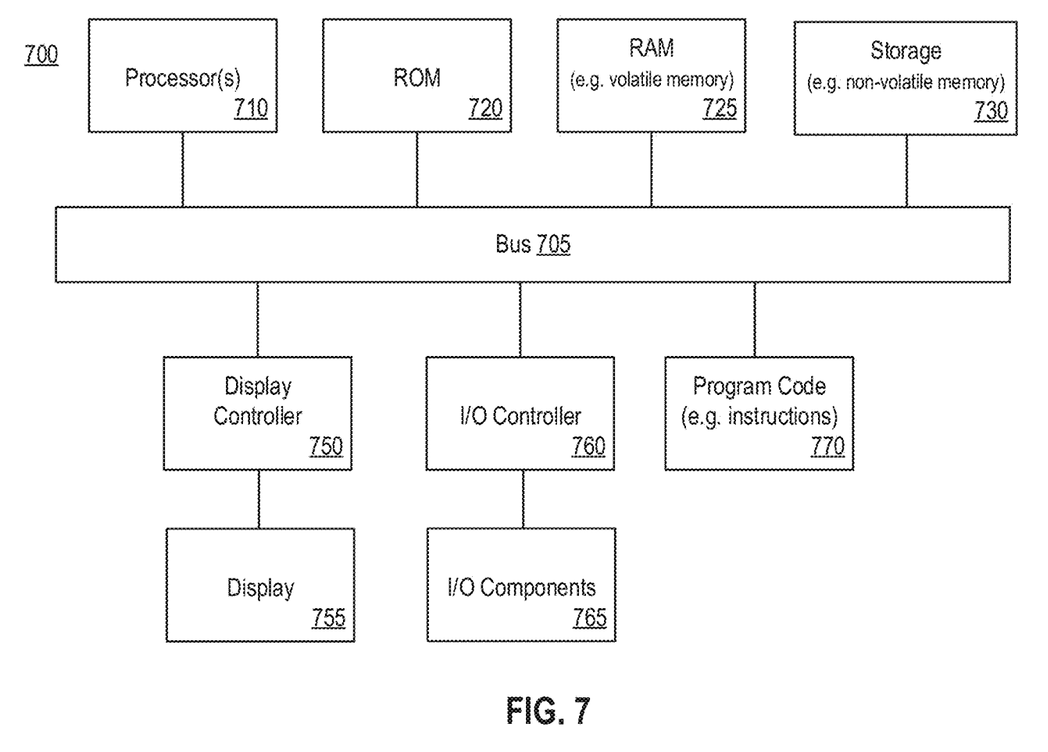
FIG. 7 is a block diagram illustrating an example computing system that may be used in conjunction with one or more embodiments of the disclosure.

FIG. 7 shows a block diagram of an example of a computing system that may be used in conjunction with one or more embodiments of the disclosure. For example, computing system 700 (or system, or server, or computing device, or device) may represent any of the devices or systems (e.g. secondary storage system 170, storage server 205, etc.) described herein that perform any of the processes, operations, or methods of the disclosure. Note that while the computing system 700 illustrates various components, it is not intended to represent any particular architecture or manner of interconnecting the components as such details are not germane to the present disclosure. It will also be appreciated that other types of systems that have fewer or more components than shown may also be used with the present disclosure.

As shown, the computing system 700 may include a bus 705 which may be coupled to a processor 710, ROM (Read Only Memory) 720, RAM (or volatile memory) 725, and storage (or non-volatile memory) 730. The processor(s) 710 may retrieve stored instructions from one or more of the memories 720, 725, and 730 and execute the instructions to perform processes, operations, or methods described herein. These memories represent examples of a non-transitory computer-readable medium (or machine-readable medium, a computer program product, etc.) containing instructions (or program code) which when executed by a processor (or system, device, etc.), cause the processor to perform operations, processes, or methods described herein.

As referred to herein, for example, with reference to the claims, a processor may include one or more processors. Moreover, the one or more processors 710 may perform operations in an on-demand or "cloud computing" environment or as a service (e.g. within a "software as a service" (SaaS) implementation). Accordingly, the performance of operations may be distributed among the one or more processors 710, whether residing only within a single machine or deployed across a number of machines. For example, the one or more processors 710 may be located in a single geographic location (e.g. within a home environment, an office environment, or a server farm), or may be distributed across a number of geographic locations. The RAM 725 may be implemented as, for example, dynamic RAM (DRAM), or other types of memory that require power continually in order to refresh or maintain the data in the memory. Storage 730 may include, for example, magnetic, semiconductor, tape, optical, removable, non-removable, and other types of storage that maintain data even after power is removed from the system. It should be appreciated that storage 730 may be remote from the system (e.g. accessible via a network).

A display controller 750 may be coupled to the bus 705 in order to receive display data to be displayed on a display device 755, which can display any one of the user interface features or embodiments described herein and may be a local or a remote display device. The computing system 700 may also include one or more input/output (I/O) components 765 including mice, keyboards, touch screen, network interfaces, printers, speakers, and other devices. Typically, the input/output components 765 are coupled to the system through an input/output controller 760.

Program code 770 may represent any of the instructions, applications, software, libraries, toolkits, modules, components, engines, units, functions, logic, etc. as described herein (e.g. secondary storage system 170, storage system OS 212, storage server 205, etc.). Program code 770 may reside, completely or at least partially, within the memories described herein (e.g. non-transitory computer-readable media), or within a processor during execution thereof by the computing system. Program code 770 may include both machine code, such as produced by a compiler, and files containing higher-level or intermediate code that may be executed by a computing system or other data processing apparatus (or machine) using an interpreter. In addition, program code 770 can be implemented as software, firmware, or functional circuitry within the computing system, or as combinations thereof. Program code 770 may also be downloaded, in whole or in part, through the use of a software development kit or toolkit that enables the creation and implementation of the described embodiments.

Moreover, any of the disclosed embodiments may be embodied in various types of hardware, software, firmware, and combinations thereof. For example, some techniques disclosed herein may be implemented, at least in part, by non-transitory computer-readable media that include program instructions, state information, etc., for performing various methods and operations described herein.

It should be noted that references to ordinal numbers such as "first," "second," "third," etc., may indicate an adjective for an element (e.g. any noun in the application). The use of ordinal numbers does not necessarily imply or create any particular ordering of the elements nor limit any element to being only a single element unless expressly disclosed, such as by the use of the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements. In addition, the use of the term "or" indicates an inclusive or (e.g. and/or) unless otherwise specified. For example, the phrase "at least one of x, y, or z" means any one of x, y, and z, as well as any combination thereof. In addition, the term "based on" is used to describe one or more factors that affect a determination. These terms do not foreclose additional factors that may affect a determination. For example, the phrase "determining A based on B" includes B being a factor that affects the determination of A, and does not foreclose the determination of A from also being based on C. However, in other instances, A may be determined based solely on B, such as by the use of the terms "only," "solely," and other such terminology. In addition, the term "approximately" or "substantially" may be used herein and may be interpreted as "as nearly as practicable," "within technical limitations," and the like.

Other embodiments of the disclosure will be apparent to those skilled in the art from consideration of the specification and practice of the invention disclosed herein. It is intended that the specification and examples be considered as examples only, with a true scope and spirit of the embodiments being indicated by the claims.

What is claimed is:

1. A system comprising:
one or more processors; and
a non-transitory computer readable medium storing a plurality of instructions, which when executed, cause the one or more processors to:
apply a retention lock to data stored by a storage system to ensure data retention compliance, the retention lock requiring a dual-party authentication to modify the data, the dual-party authentication requiring credentials from a first authorized user and a second authorized user, the storage system including a remote access controller allowing a third authorized user to modify a storage configuration associated with the storage system;
receive, from the first authorized user, a request to enable a retention lock compliance mode;
confirm credentials from the second authorized user, in response to the request to enable the retention lock compliance mode;
obtain configuration information for one or more user accounts for the remote access controller, the one or more user accounts including an administrative user account and a limited user account;
initiate disabling previous user accounts associated with the remote access controller, the previous user accounts including an account associated with the third authorized user;
initiate creating the administrative user account and the limited user account for the remote access controller, the administrative user account set to a disabled state and the limited user account set to an enabled state; and
activate the retention lock compliance mode for the storage system, the retention lock compliance mode requiring the dual-party authentication to access the remote access controller.

2. The system of claim 1, wherein the limited user account restricts a user to operations associated with restarting or powering-on the storage system using the remote access controller.

3. The system of claim 1, wherein initiating disabling previous user accounts associated with the remote access controller includes:
resetting a root user password for the remote access controller, and periodically resetting
the root user password after activating the compliance lock retention mode;
deleting the previous user accounts associated with the remote access controller; and
terminating any active user account sessions associated with the remote access controller.

4. The system of claim 1, wherein the dual-party authentication mechanism for the retention lock is administered by a filesystem of the storage system, and an authentication mechanism for the remote access controller is administered by components of the remote access controller independent of the filesystem.

5. The system of claim 1, wherein the plurality of instructions, when executed, further cause the one or more processors to:

receive, from the first authorized user, a request to access the remote access controller;
confirm credentials from the second authorized user, in response to the request to access the remote access controller and a determination the retention lock compliance mode is activated;
initiate enabling the administrative user account for a limited duration;
verify credentials for the administrative user account;
allow the administrative user account to perform one or more operations on the storage system using the remote access controller; and
initiate disabling the administrative user account after the limited duration.

6. The system of claim 1, wherein the storage system includes a server managing a set of storage components that store the data, and the remote access controller includes physical components associated with the server.

7. The system of claim 6, wherein the remote access controller executes on a separate processor than the processor executing an operating system of the storage system.

8. The system of claim 6, wherein the remote access controller is part of a baseboard management controller (BMC) of the server.

9. A method comprising:
applying a retention lock to data stored by a storage system to ensure data retention compliance, the retention lock requiring a dual-party authentication to modify the data, the dual-party authentication requiring credentials from a first authorized user and a second authorized user, the storage system including a remote access controller allowing a third authorized user to modify a storage configuration associated with the storage system;
receiving, from the first authorized user, a request to enable a retention lock compliance mode;
confirming credentials from the second authorized user, in response to the request to enable the retention lock compliance mode;
obtaining configuration information for one or more user accounts for the remote access controller, the one or more user accounts including an administrative user account and a limited user account;
initiating disabling previous user accounts associated with the remote access controller, the previous user accounts including an account associated with the third authorized user;
initiating creating the administrative user account and the limited user account for the remote access controller, the administrative user account set to a disabled state and the limited user account set to an enabled state; and
activating the retention lock compliance mode for the storage system, the retention lock compliance mode requiring the dual-party authentication to access the remote access controller.

10. The method of claim 9, wherein the limited user account restricts a user to operations associated with restarting or powering-on the storage system using the remote access controller.

11. The method of claim 9, wherein initiating disabling previous user accounts associated with the remote access controller includes:
resetting a root user password for the remote access controller, and periodically resetting the root user password after activating the compliance lock retention mode;
deleting the previous user accounts associated with the remote access controller; and
terminating any active user account sessions associated with the remote access controller.

12. The method of claim 9, wherein the dual-party authentication mechanism for the retention lock is administered by a filesystem of the storage system, and an authentication mechanism for the remote access controller is administered by components of the remote access controller independent of the filesystem.

13. The method of claim 9, further comprising:
receiving, from the first authorized user, a request to access the remote access controller;
confirming credentials from the second authorized user, in response to the request to access the remote access controller and a determination the retention lock compliance mode is activated;
initiating enabling the administrative user account for a limited duration;
verifying credentials for the administrative user account;
allowing the administrative user account to perform one or more operations on the storage system using the remote access controller; and
initiating disabling the administrative user account after the limited duration.

14. The method of claim 9, wherein the storage system includes a server managing a set of storage components that store the data, and the remote access controller includes physical components associated with the server.

15. A computer program product comprising a non-transitory computer-readable medium having a computer-readable program code embodied therein to be executed by one or more processors, the program code including instructions to:
apply a retention lock to data stored by a storage system to ensure data retention compliance, the retention lock requiring a dual-party authentication to modify the data, the dual-party authentication requiring credentials from a first authorized user and a second authorized user, the storage system including a remote access controller allowing a third authorized user to modify a storage configuration associated with the storage system;
receive, from the first authorized user, a request to enable a retention lock compliance mode;
confirm credentials from the second authorized user, in response to the request to enable the retention lock compliance mode;
obtain configuration information for one or more user accounts for the remote access controller, the one or more user accounts including an administrative user account and a limited user account;
initiate disabling previous user accounts associated with the remote access controller, the previous user accounts including an account associated with the third authorized user;
initiate creating the administrative user account and the limited user account for the remote access controller, the administrative user account set to a disabled state and the limited user account set to an enabled state; and
activate the retention lock compliance mode for the storage system, the retention lock compliance mode requiring the dual-party authentication to access the remote access controller.

16. The computer program product of claim 15, wherein the limited user account restricts a user to operations associated with restarting or powering-on the storage system using the remote access controller.

17. The computer program product of claim 15, wherein initiating disabling previous user accounts associated with the remote access controller includes:

resetting a root user password for the remote access controller, and periodically resetting the root user password after activating the compliance lock retention mode;

deleting the previous user accounts associated with the remote access controller; and terminating any active user account sessions associated with the remote access controller.

18. The computer program product of claim 15, wherein the dual-party authentication mechanism for the retention lock is administered by a filesystem of the storage system, and an authentication mechanism for the remote access controller is administered by components of the remote access controller independent of the filesystem.

19. The computer program product of claim 15, wherein the program code includes further instructions to:

receive, from the first authorized user, a request to access the remote access controller;

confirm credentials from the second authorized user, in response to the request to access the remote access controller and a determination the retention lock compliance mode is activated;

initiate enabling the administrative user account for a limited duration;

verify credentials for the administrative user account;

allow the administrative user account to perform one or more operations on the storage system using the remote access controller; and initiate disabling the administrative user account after the limited duration.

20. The computer program product of claim 15, wherein the storage system includes a server managing a set of storage components that store the data, and the remote access controller includes physical components associated with the server.

* * * * *